Jan. 22, 1957  H. HERLACH ET AL  2,778,278
GUN-CARRIAGE WITH MUZZLE BRAKE
Filed April 12, 1952  3 Sheets-Sheet 1

INVENTORS
Heinrich Herlach and Oskar Schwager
BY
Richard G Geier
ATTORNEYS

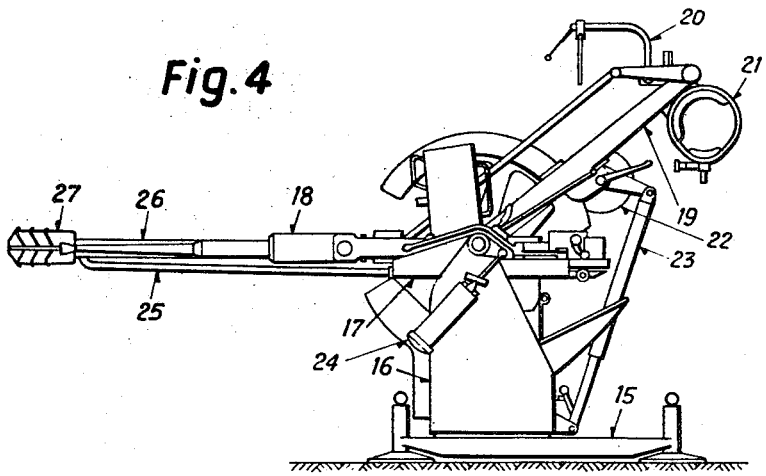
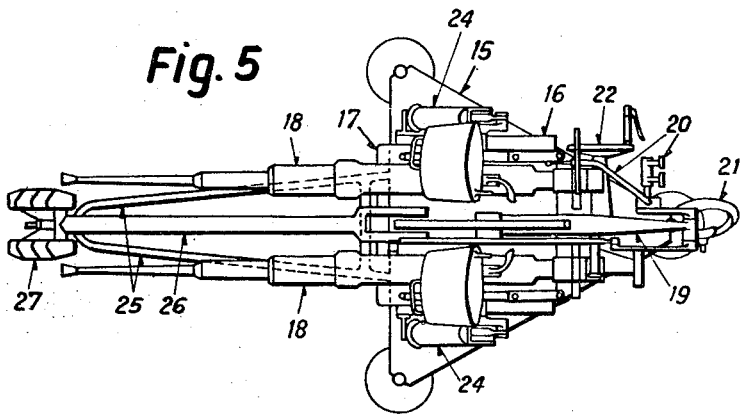
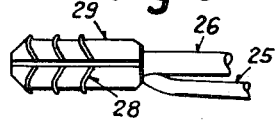
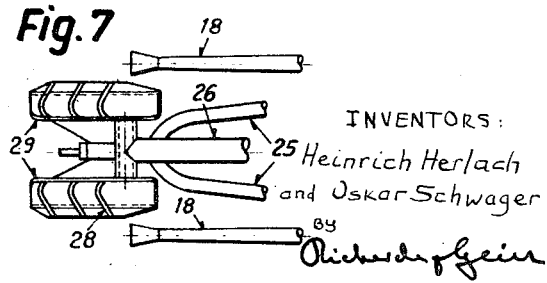
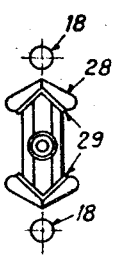

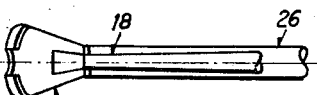
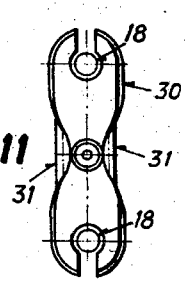
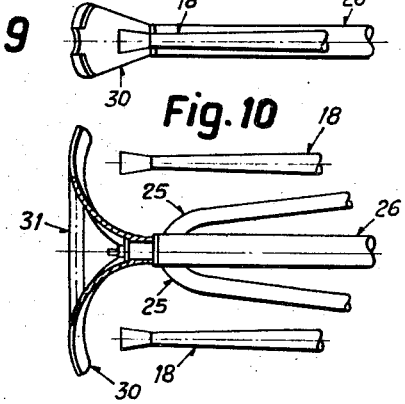
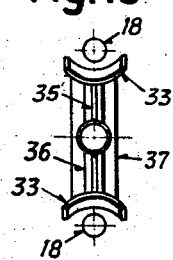
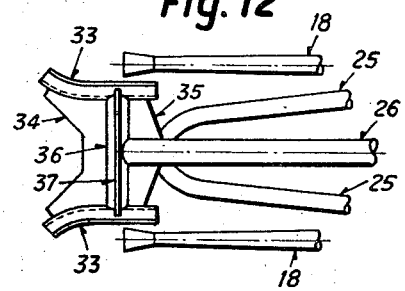
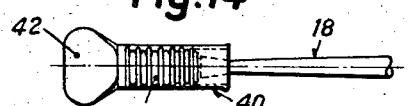
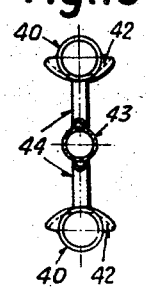
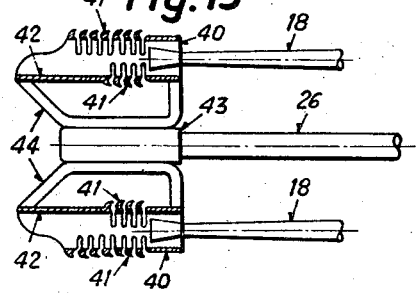
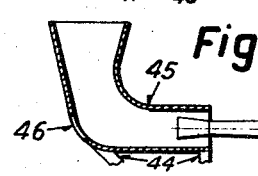

United States Patent Office 2,778,278
Patented Jan. 22, 1957

2,778,278

GUN-CARRIAGE WITH MUZZLE BRAKE

Heinrich Herlach and Oskar Schwager, Zurich, Switzerland, assignors to Machine Tool Works Oerlikon, Administration Company, Zurich-Oerlikon, Switzerland, a company organized under Swiss laws Application April 12, 1952, Serial No. 281,952

5 Claims. (Cl. 89—42)

This invention relates to twin guns and refers more particularly to the compensation of recoiling energy occurring in such guns.

It is an object of the invention to compensate by means of muzzle brakes recoiling energy exerted upon each of the gun barrels of twin guns and also to compensate the torque exerted upon the cradle due to the eccentric arrangement of the barrels to the vertical rotation axis of the cradle.

Another object of the invention consists in improving the construction of muzzle brakes by making such muzzle brakes lighter and of a simpler construction than those in prior art.

According to a preferred embodiment of the invention a longitudinal carrier is mounted upon the cradle and is located between the two barrels of a twin gun construction, a double muzzle brake being located upon the free end of the carrier close to the ends of the two barrels. Each of the two parts of the double muzzle brake is provided with a pair of deflecting devices consisting of baffles extending along the axis of the barrel in front of the opening of one of the barrels upon that side thereof which faces the other barrel. These deflecting baffles carry other deflecting baffles extending transversely to the axis of the barrel. Gases emerging out of the nozzle of one of the barrels strike the baffles extending along the axis of the barrel and produce a torque which acts upon the cradle in a direction opposed to the torque produced by the recoil. At the same time these gases exert upon baffles extending transversely to the barrel gas a force which acts in the direction of this axis and which is opposed to the force of the recoil.

Several typical embodiments of the object of the invention are represented in the accompanying drawing, in which:

Figure 4 is a carriage for two firearms, in elevational view;

Figure 5 is the same carriage in plan view;

Figure 6 is an enlarged lateral elevation of the deflecting arrangement;

Figure 7 is a plan view of the same deflecting arrangement;

Figure 8 is a rear view of the same deflecting arrangement;

Figure 9 is another embodiment of the deflecting arrangement, in elevation;

Figure 10 is a sectional plan view of the same deflecting arrangement;

Figure 11 is the same deflecting arrangement viewed from the rear;

Figure 12 is a further embodiment of a deflecting arrangement, in plan view;

Figure 13 shows the same deflecting arrangement as viewed from the rear;

Figure 14 is a further embodiment of a deflecting arrangement in elevational view;

Figure 15 shows the same deflecting arrangment in sectional plan view;

Figure 16 shows the same deflecting arrangement as viewed from the rear; and

Figure 17 is a further deflecting arrangement in sectional view.

Figure 1:
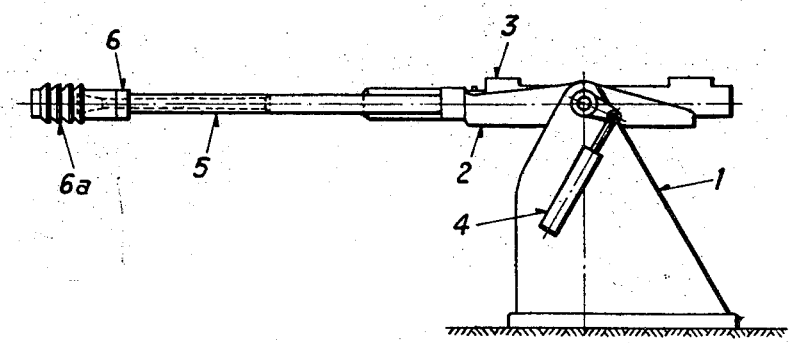
Figure 1 is a carriage for a single firearm, in lateral elevational view.
Figure 2:
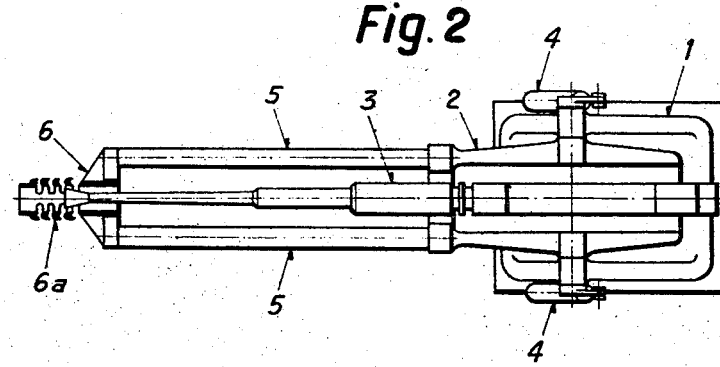
Figure 2 shows the same carriage in plan view.
Figure 3:
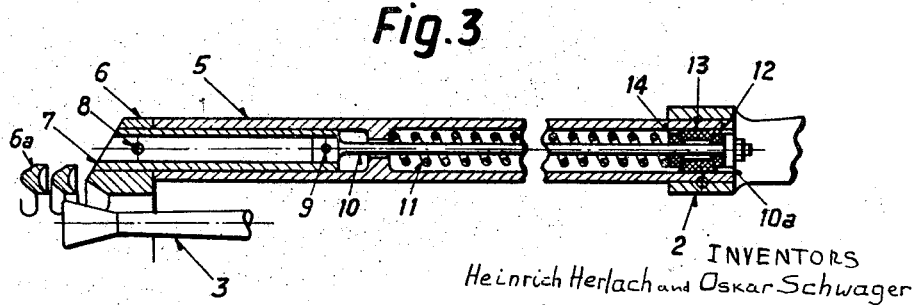
Figure 3 is a section through the carrier of the deflecting arrangement.

The gun-carriage shown in Figures 1, 2 and 3 has a base 1 on which is mounted the cradle 2 with the gun proper 3. The front-heaviness of the gun and cradle is compensated by the compensators 4. Connected to the cradle 2 are two carriers or supports 5 which are used for mounting the deflecting arrangement 6. The deflecting arrangement 6 is provided with a plurality of deflecting vanes or baffles 6a by which the gases emerging from the muzzle 3a of the gun are deflected obliquely to the rear, whereby a force counteracting the recoil force of the gun proper is generated. Between the gun 3 and the deflecting arrangement 6 there is no mechanical connection of any kind. The deflecting arrangement 6 is provided on both sides with guide tubes 7 secured by bolts 8 (Figure 3). Arranged on the guide tubes 7 and secured by bolts 9 is the connecting rod 10 the rear end of which is provided with a plate 10a. The spring 11 tends to pull rearwards, via the rings 12 and 14 and the brake-blocks 13 located therebetween, the connecting rod 10 and, with it, the tube 7 and the deflecting arrangement 6. The brake-blocks 13 are of annular segmental form and are forced outwards by the tapered lateral faces of the rings 12 and 14. They thereby generate a braking force which is proportional to the force exerted by the spring 11. During firing, on the emergence of the propellant gases, the deflecting device is drawn forwards by a force which is transmitted via the brake-blocks 13 and the spring 11 to the supports 5 and thence to the cradle of the gun-carriage. Owing to the interposed spring and friction members, the force acting on the cradle becomes fairly uniform, and therefore compensates in part the recoil forces likewise transmitted to the cradle via the recoil springs.

The gun-carriage for two firearms shown in Figures 4 and 5 has a rotation platform 15, a rotatable base 16, a cradle 17 on which the guns proper 18 are mounted movably towards recoil springs, an aiming arm 19 with gun-sight 20, shoulder rest 21, elevating gear 22 and compensator 23. The front-heaviness of the cradle and gun is compensated by the weight-compensator 24. Two supporting tubes 25 and a support 26 are connected to the cradle and carry the muzzle brake 27. It is provided with a plurality of vanes or baffles 28 disposed on angularly-arranged plates 29. As a result, the muzzle gases are deflected obliquely inwards. The design of the muzzle brake is such that the thrust component, proceeding obliquely in respect of the centreline of the gun-barrel of each half of the muzzle brake just compensates the momentum about the training axis of the gun generated by the recoil of each individual gun-barrel; in this way, should one barrel fail during firing, no torque is exerted on the gun assembly, and it is therefore easily possible to fire with one barrel only.

Figures 9 to 11 depict a further embodiment of a muzzle brake for twin gun carriages. The mounting of the muzzle brake is again the same as in the embodiment shown in Figures 6 to 8. The muzzle brake itself consists essentially of two vaulted plates 30 arranged in an essentially transverse direction to the axis of the gun-barrel, by which said plates the gases are deflected sidewards. The plates 30 are assymetrically arranged in respect of the gun muzzles, in such a way that the resutlant force of each separate half compensates the momentum of the recoil force about the gun axis. The plates 30 are strengthened by two braces 31.

Figures 12 and 13 show a similar deflecting arrangement. The baffles consist only of slightly vaulted and curved plates 33 essentially parallel to the gun-barrel axis and connected to the support 26 by the flanges 34, 35 and 37 and the transverse tube 36. The construction of the mounting for the muzzle brake is the same as in the embodiment shown in Figures 4 to 8.

The deflecting arrangement shown in Figures 14 to 16 has an essentially cylindrical portion 40 on each gun muzzle. The said cylindrical portion 40 has on each side deflecting vanes or baffles 41 the number of which may vary. The baffles generate a force in the axial direction. On the inside, the wall of the cylindrical portion is lengthened and widened, thus forming a broad surface 42. Through the reaction of the gases on the surface 42, and through the non-symmetrical arrangement of the baffles 41, a transverse force is generated by which the recoil momentum of the separate weapons is compensated. The deflecting arrangement is connected to a support 26 by the tube 43 and the connecting members 44, said support 26 corresponding in essence to the supporting system shown in Figures 3 to 5.

Figure 17, finally, shows a sectional view through half of a further deflecting arrangement. The latter has the form of an elbowed tube 45 in which a hole 46 is provided for the projectile. A portion of the gases is therein deflected obliquely outwards, in such a way that the resultant force again compensates the recoil momentum of the separate weapons.

I claim:

1. In a gun carriage having a cradle pivoted for azimuthal rotation, said cradle being swingable for rotation about a substantially vertical axis, in combination, two parallel guns located upon said cradle on opposite sides of said axis, means supporting said guns for reciprocal movement upon said cradle whereby recoil forces which are eccentric to said axis are transmitted to said cradle during firing, baffle means carried by said cradle adjacent to the muzzles thereof and comprising surfaces extending transversely to a plane passing through the axes of said guns, said surfaces being located forwardly of the muzzles and comprising portions located between the guns, and extending alongside the guns, said surfaces comprising other portions extending transversely to the guns, whereby gases emerging from the muzzles exert forces upon said cradle which are opposed to said recoil forces.

2. A gun carriage in accordance with claim 1 wherein said baffle means comprise two strip-like members having curved surfaces, the convex side of the curved surface of each of said members being located at the side of and extending forwardly of the muzzle of one of said guns.

3. A gun carriage in accordance with claim 1 wherein said baffle means comprise two strip-like members having curved surfaces, the convex side of the curved surface of each of said members being located at the side of and extending forwardly of the muzzle of one of said guns, each of said members having an opening formed therein for the passage of gases emerging from the guns, the axes of said guns extending through said openings.

4. A gun carriage in accordance with claim 1 wherein said baffle means comprise two tubular members, each of the muzzles projecting into one of said members, and a plurality of segment-shaped elements extending transversely to the axes of the guns and mounted upon that part of the outer surface of said member which intersects a plane extending through the guns, openings being formed between said elements, whereby in each of said members the number of openings upon the side directed toward the other member is smaller than the number of openings upon the opposite side.

5. A gun carriage in accordance with claim 1 wherein said baffle means comprise a tubular bent member which is enlarged from one end to the other, and means supporting said member to extend with its narrower end over the muzzle of one of the guns, whereby the wider end of said member is directed away from the axes of the guns and has an opening formed therein containing the axis of a gun for the passage of the projectile fired from the gun.

References Cited in the file of this patent

UNITED STATES PATENTS

| | | |
|---|---|---|
| 430,214 | Maxim | June 17, 1890 |
| 968,678 | McClean | Aug. 30, 1910 |
| 1,822,079 | Bull et al. | Sept. 8, 1931 |
| 1,896,454 | Marek | Feb. 7, 1933 |